United States Patent [19]

Paulve

[11] 4,341,931
[45] Jul. 27, 1982

[54] SWITCHING DEVICE COMPRISING AT LEAST ONE CONTACT MEMBER MOUNTED PIVOTALLY ABOUT AXIS PARALLEL TO THE AXIS OF A CASING, AGAINST THE ACTION OF A LEAF SPRING MOUNTED IN CURVED POSITION BETWEEN SAID CASING AND SAID MEMBER

[76] Inventor: Marcel L. A. Paulve, Moulin des Serres, 83490 Le Muy, France

[21] Appl. No.: 213,721

[22] Filed: Dec. 5, 1980

[30] Foreign Application Priority Data

Dec. 7, 1979 [FR] France ................................ 79 30113
Oct. 16, 1980 [FR] France ................................ 80 22143

[51] Int. Cl.³ ........................................... H01H 19/62
[52] U.S. Cl. .............................. 200/30 A; 200/19 A; 200/31 A; 200/283
[58] Field of Search ............. 200/19 A, 30 A, 30 AA, 200/31 A, 283, 293

[56] References Cited

U.S. PATENT DOCUMENTS

| 1,169,089 | 1/1916 | Lawton et al. | 200/283 |
| 2,049,637 | 8/1936 | Baker | 200/30 A |
| 2,851,546 | 9/1958 | Phelon et al. | 200/30 A |
| 2,896,035 | 7/1959 | Harrington et al. | 200/30 AA |
| 2,996,569 | 8/1961 | Phelon | 174/153 |
| 3,944,773 | 3/1976 | Schumacher | 200/293 |

FOREIGN PATENT DOCUMENTS

| 1252608 | 4/1956 | France | 200/30 A |
| 1595257 | 7/1970 | France | |

Primary Examiner—John W. Shepperd
Attorney, Agent, or Firm—Steinberg & Raskin

[57] ABSTRACT

The invention concerns an improvement in an electric switching device comprising at least one leaf spring mounted in curved position between the internal surface of a casing and the opposite surface of a member mounted pivotally about an axis parallel to the axis of the casing and carrying an electric contact member. The leaf spring is fixed on the internal surface of the casing by the head of a screw with a tightening nut. A stop member is interposed between the said spring end to be fixed and the said internal surface of the casing and provided with a recess of a shape complementary to the shape of the said spring end so as to lock the said spring end in the said recess, and stop means are provided integral with the said casing and comprising a flat stop surface perpendicular to the internal surface of the casing, upon which bears a planar lateral surface of the head.

10 Claims, 7 Drawing Figures

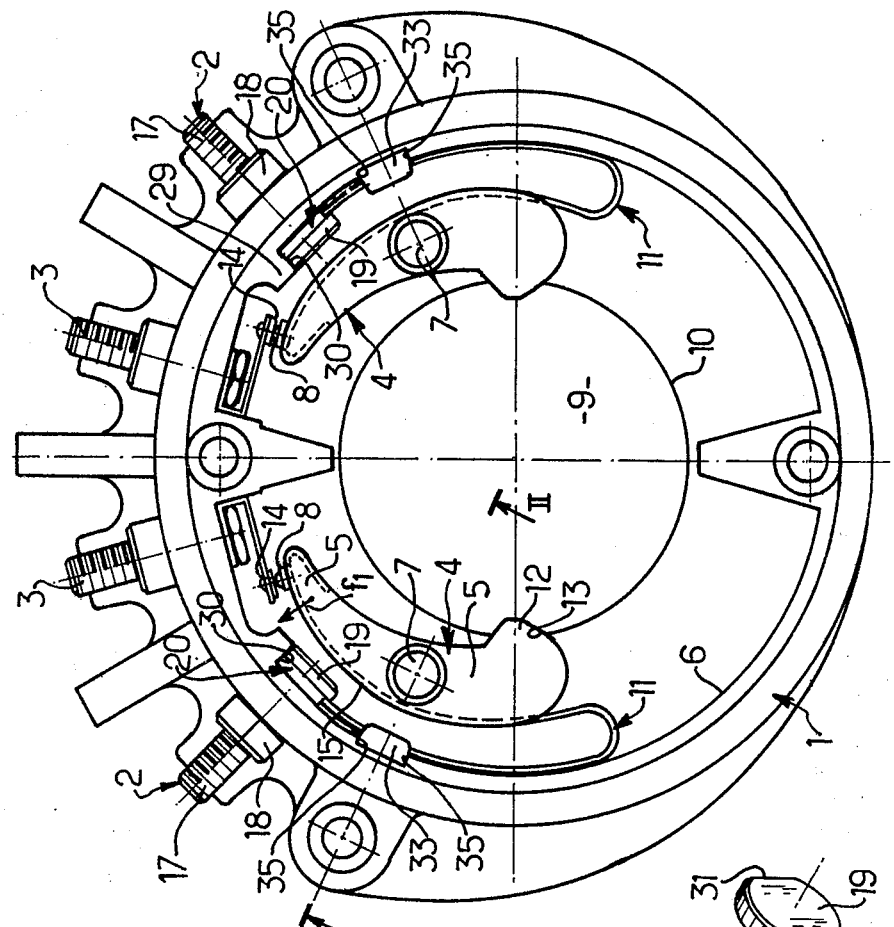
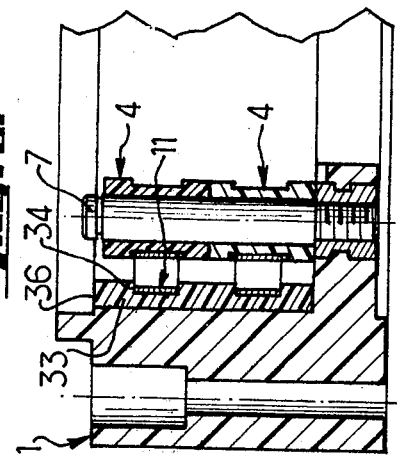
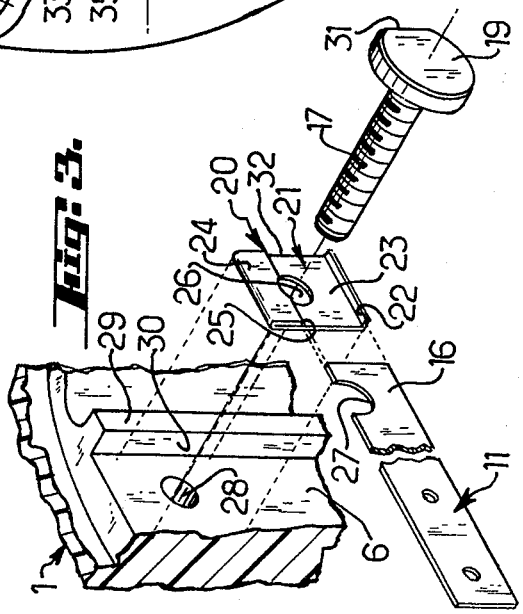

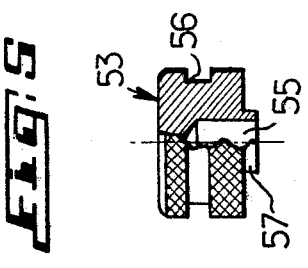
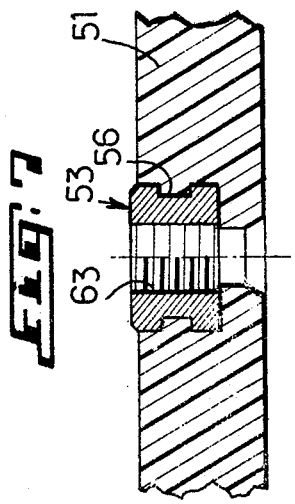
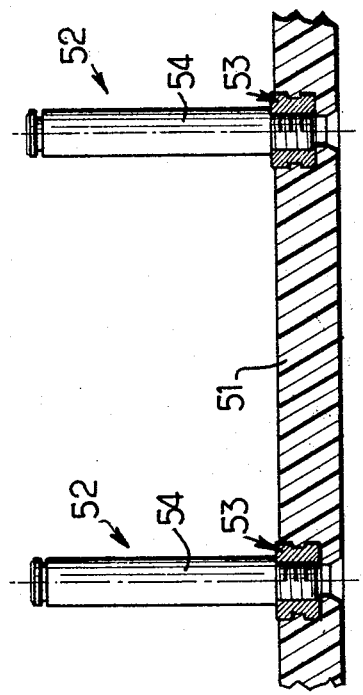
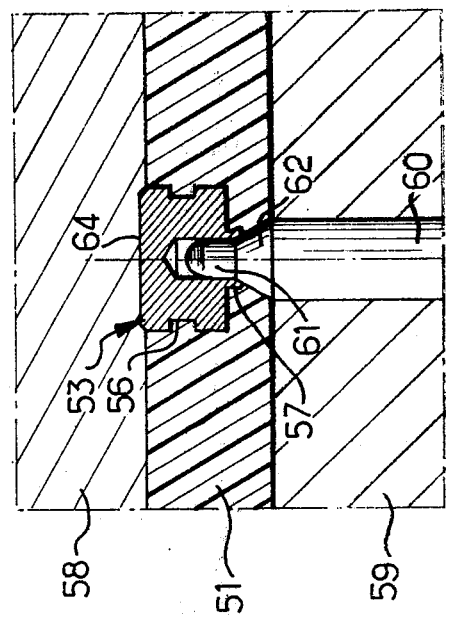

SWITCHING DEVICE COMPRISING AT LEAST ONE CONTACT MEMBER MOUNTED PIVOTALLY ABOUT AXIS PARALLEL TO THE AXIS OF A CASING, AGAINST THE ACTION OF A LEAF SPRING MOUNTED IN CURVED POSITION BETWEEN SAID CASING AND SAID MEMBER

The present invention relates to and has essentially for its subject matter an improvement in a switching device of the type comprising essentially at least one leaf spring mounted in curved position between the internal surface of a casing forming a stator and the opposite surface of a member in the form of a lever, capable of pivoting about an axis parallel to the axis of the stator, under the action of an actuating member and against the action of the said spring, the said stator bearing a stationary electric contact device and the movable member being provided with a contact element forming a movable contact intended to cooperate with a stationary contact of the said stator, the said leaf spring being fixed at one end to the internal surface of the casing, through the medium of a screw with a tightening nut.

The known switching devices of this type suffer from a certain number of drawbacks. The springs are obtained by being cut out so as to be provided with a fixing head allowing them to be correctly mounted on the casing. However, despite a good finishing, it has proved impossible to avoid the formation of incipient cracs or tears leading to spring breakage after a certain time of operation. In addition, the fixing of the spring to the casing is difficult. Indeed, during the rotation of the tightening nut, the end of the spring to be fixed to the casing tends to be displaced angularly. Now such a displacement is prejudicial to a correct pivoting of the movable member and may even result in a sticking on the said member. Thus the fixing of the spring to the casing is a complicated operation to be carried out.

It is obvious that in a switching device of this type comprising at least two levers, each rotatable about an axis parallel to the axis of the stator, both axes must be strictly parallel to one another.

Up to the present, the pivots were inserted into the casing of plastics material during the molding operation. It is relatively easy to ensure the parallelism of the pivots during the positioning, but on the other hand it is very difficult to preserve said parallelism of the pivots during the withdrawal of the molding from the mold. Quite often, the molding after being stabilized displays a dispersion which makes it unusable.

The purpose present invention is to provide a switching device of the type described above, which does not suffer from the drawbacks just mentioned.

To attain this aim, the improved switching device according to the invention comprises a stop member interposed between the said spring end to be fixed and the said internal surface of the casing and provided with a recess of a shape complementary to the shape of the said spring end, so as to lock the latter in the said recess, and stop means integral with the casing and comprising a flat surface perpendicular to the internal surface of the casing, upon which bears a lateral flat surface of the head of the tightening screw. According to an advantageous characterizing feature of the invention, the switching device comprises intercalated guiding means associated with the casing and provided with one guiding slot for each leaf spring.

According to another advantageous characterizing feature of the invention, the spring leaf is obtained by rolling.

To ensure the parallelism of the pivots of the levers, the present invention provides that each pivot be formed by an assembly of two portions, one of which is designed in the form of an anchoring base which is incorporated in the bottom wall of the casing during the molding, is provided initially with a centering hole into which engages, during the molding, a centering pin forming part of the mold and which is machined after the molding to receive the second portion the pivot, in the form of a stud.

According to an advantageous characterizing feature of the invention, the anchoring base is provided at the inlet of its centering hole with a deformable annular skirt and the centering pin has a conical portion upon which the skirt bears during the fitting of the anchoring base onto the pin. Owing to the possibility of deformation of the annular skirt, the axial position of the anchoring base on the centering pin is adjustable.

The present invention also provides a method for mounting parallel pivots in the casing, which is characterized in that there is provided in the mold one centering pin for each anchoring base of a particular shape, the plastics material is thereafter injected into the mold and the anchoring bases are machined after the molding to form orifices receiving the stud.

The invention will be better understood and other purposes, characterizing features, details and advantages of the latter will appear more clearly as the following explanatory description proceed with reference to the appended diagrammatic drawings given solely by way of example illustrating one form of embodiment of the invention and wherein:

FIG. 1 is a top view of the improved switching device according to the invention, with the cover removed;

FIG. 2 is a partial sectional view upon II—II of FIG. 1;

FIG. 3 is an exploded perspective view of the device for fixing the spring to the casing, according to the invention;

FIG. 4 is an axial sectional view of a portion of the bottom wall of the casing, into which are inserted two metal pivots, according to the invention;

FIG. 5 is an elevational, partially broken-away view of an anchoring base according to the invention;

FIG. 6 is an axial sectional view through a mold with an anchoring base according to the invention fitted onto the centering pin; and FIG. 7 is an axial sectional view of part of the bottom wall of a casing in which is incorporated an anchoring base subsequent to the machining of the latter.

The present invention relates to an improvement in a switching device such as the one shown in particular in FIG. 1. This device is of a known general structure. It comprises essentially a casing 1 of insulating material, preferably of plastics, generally cylindrical in shape and provided with one or several sets of two external electric terminals 2, 3, one or several movable members 4 of insulating material, advantageously of plastics and preferably in the form of a double lever 5, each mounted pivotally about a pivot pin 7 parallel to the axis of the casing and provided with a contact element 8 forming a movable contact, a rotor 9 mounted in coaxial relationship to the interior of the casing 1 and forming a rotary member for actuating the levers 4, owing to the cam profile of its peripheral surface 10, against which profile each lever 4 is applied, under the action of a leaf spring 11, at one of its ends provided with a portion 12 protruding radially towards the axis of the rotor 9. During the rotation of the rotor, the lever is caused to pivot in the direction of the arrow $f_1$ when the protruding portion 12 of the lever engages into a hollow 13 of appropriate shape of the profile of the rotor 9. In this position, the contact element 8 is in electrical contact with a stationary contact element 14 associated with the external electric terminal 3. As shown particularly in FIG. 1, each spring 11 also establishes an electrical connection between the movable contact element 8 provided on the corresponding lever 4 and the external electric terminal 2.

As appears from FIG. 1, the leaf spring 11 which, in the released state is in the shape of a rectilinear strip (FIG. 3) is mounted in a curved state between the internal surface 6 of the casing 1 and the opposite surface 15 of the lever 4 and bearing by an important portion of its length on the corresponding bearing surface. The end 16 of the spring 11 is fixed to the internal surface 6 of the casing through the medium of a tightening screw 17 forming at the same time the external electric terminal 2. The tightening is obtained by rotating the tightening nut 18 of the screw 17 and the end 16 of the spring is held in place by the screw head 19.

The improvement according to the invention relates to the manufacture of the spring 11 and its fixing to the casing 1. According to the invention, the spring is obtained by rolling and its longitudinal edges therefore display a rounded profile without incipient cracks or tears.

The fixing device according to the invention is particularly represented in FIG. 3, which shows an exploded perspective view thereof. This device comprises means which prevent any angular displacement of the end 16 of the spring with respect to the surface 6 of the casing, during the tightening by means of the nut 18.

To this end, the fixing device comprises a stop member 20 intended to be interposed between the internal surface 6 of the casing 1 and the spring end 16 to be fixed. The stop member 20 is provided with a recess 21 of a shape complementary to the shape of the end 16 of the spring 1 to allow the said end to be secured in the said recess in the manner indicated in dashed lines in FIG. 3.

The stop member 20 with its recess 21 is formed from a metal plate of the same thickness as the spring. One end of this plate is raised to form a flange 22 extending substantially vertically with respect to the flat portion 23 of the plate. The portion 23 forms the bottom of the recess. The other end portion of the plate has been folded down to form a raised portion 24 with respect to the portion 23. The thickness of the portion 24 is therefore twice greater than the portion 23. The folded portion 25 extends in parallel relationship to the flange 22. The latter and the edge or end 25 constitute the lateral surfaces of the recess 21 whose bottom is constituted by the upper surface of the flat portion 23. The distance between the flange 22 and the edge 25 obtained by folding is slightly greater than the width of the spring end 16 to be fixed. The recess 21 is therefore of a shape complementary to that of the end 16 to ensure a tight fit of the end 16 in the recess 21. In the stop member 20 is also provided a hole 26 for the passage of the tightening screw 17, which is coaxial with a notch 27 provided in the end 16 of the spring 11 and a passage 28 for the screw 17 through the wall of the casing 1.

The fixing device according to the invention also comprises means intended to prevent any angular displacement of the stop member 20 and of the tightening screw 17 during the rotation of the tightening nut 18. These means comprise an axial rib 29 including a substantially flat surface 30 which extends perpendicularly from the surface 6 towards the center of the casing 1. The rib 29 is so arranged with respect to the passage 28 for the screw 17 through the casing that the flat surface 30 forms an abutment or stop surface against which a flat surface 31 of the head 19 of the screw 17 bears after the fixing device is mounted. In this position, any rotation of the head 19 of the screw 17 is impossible. The stop surface 30 may also serve for selective angular locking of the stop member 20, if the latter is so dimensioned that the flat lateral surface 32 applies against the stop surface 30 when the fixing device is in the assembled or mounted state.

It is understood that the end 16 of the spring 11 is thus perfectly locked and that any angular movement of the latter is thus excluded even when the tightening nut 18 is firmly tightened.

To additionally improve the guiding and locking of the springs on the internal surface 6 of the casing 1, there are provided intercalated guiding means for each spring 11, constituted in the example illustrated by intercalated members 33 secured to the internal surface 6 of the casing 1 and provided with a guiding slot 34 for each spring. Since the switching device illustrated by way of example comprises two levers 4 rotatably mounted about a same axis pin 7 one above the other, and therefore two springs 11, the intercalated member in the shape of a bar, according to FIG. 1, comprises two slots 34 perpendicular to the longitudinal axis of the bar and in the width of which is slightly greater than the width of a spring 11, so that the latter, after being engaged into the slot, is locked laterally.

Each intercalated member 33 may be fixed to the internal surface 16 of the casing 1 in any suitable manner. It is advantageous, however, to fix each member 33 to the casing 1 by means of an anchoring slot 35 provided in the internal surface 6 of the casing and obtained by molding at the same time as the casing 1 made of an insulating material, advantageously of a plastics material. The slots 35 correspond in cross-section to the intercalated member 33 and advantageously have a tapering shape, e.g. a trapezoidal shape. Each bar is then introduced into its anchoring slot by sliding axially from the open upper end 36 of the slot.

It should be noted that the invention is not limited to the form of embodiment described and illustrated in the FIGS. Many variants may be contemplated. Thus, in order to improve the angular locking effect of the tightening screw 17, through the medium of the stop surface 30, the head 19 of the tightening screw may be square in shape so as to provide a greater flat locking surface. The guiding means, instead of being in the form of separate members 34 may be cast integral with the casing 1. It is also possible, within the scope of the invention, to obtain the stop member 20 in any suitable manner, e.g. by machining, and not by folding a metal tongue, as in the case illustrated. It should also be noted that the fixing device according to the invention allows, without increasing the space occupied thereby, the mounting in a same casing of a much greater number of switching units than in the example illustrated, each unit comprising a lever 4, a spring 11 and fixing means. The stop means provided on the internal surface of the casing being constituted by axial ribs and the intercalated means 33, e.g. by small bars which may be relatively long, a relatively great number of units can be easily superposed.

It is easily understood that in a switching device with several switching units, the pivot pins of the levers must be strictly parallel. The present invention provides a solution to this problem.

FIG. 4 illustrates a portion of a bottom wall 51 of a casing of electrically insulating material, i.e. of plastics material, in which two metal pivots 52 are mounted. The pivots 52 correspond to the pivot axes 7 shown in FIGS. 1 and 2. Each pivot is made up of two portions, a body forming an anchoring base 53 incorporated in the bottom wall 51 and a portion in the form of a stud 54 engaged into the anchoring base 53.

FIG. 5 shows an anchoring body 53 in its initial state. This body is generally cylindrical in shape and provided with a blind axial centering hole 55 and a retaining groove 56 provided in its external cylindrical surface. A deformable circular skirt 57 is provided around the inlet of the centering hole 54.

In FIG. 6 are seen the upper and lower portions 58 and 59 of a mold, separated by the bottom wall 51 of a casing according to the invention. Also shown in the Figure is a pin 60 forming part of the lower portion 59 of the mold and onto which is fitted an anchoring base 53. The pin 60 is provided at its end with a cylindrical centering end portion 61 intended to be engaged into the centering hole 55 of the anchoring base 53. To the end portion 61 is connected a conical portion 62 whose diameter increases gradually from the end portion 61. As appears from FIG. 5, the annular skirt portion 57 of the anchoring base 53 is deformed when in contact with the conical portion 62 of the pin 60, when the base 53 is tightly fitted onto the pin.

FIG. 7 shows the anchoring base 53 incorporated in the bottom wall 51 of the casing after the removal of the mold from the molding. It is observed that the anchoring base 53 has been machined. It has been bored and the bore 63 thus formed has been tapped. Into this tapped bore will be screwed the stud 54, as appears from FIG. 4.

The various stages of mounting of the pivot in a casing of plastics material, according to the invention, can be deduced from the above description. The anchoring base 53 is fitted onto the base 60 before the injection of the plastics material into the mold. The latter is still open. The accurate positioning is facilitated by the deformability of the skirt 57. Then the mold is closed by applying its upper portion onto the upper surface 64 of the anchoring base 53. If it is found that the mold is closed incompletely, it is sufficient to exert a vertical pressure on the upper portion 58, which pressure results in an axial pressure component on the anchoring base 53 which then engages still further onto the pin 60 owing to the deformability of the skirt 57. Thereafter, the plastics material is injected into the mold. After removing the casing, in which is now incorporated the anchoring base 53, the latter is bored and tapped to allow the screwing of the stud 54 which is threaded at its end into the tapped hole 63 of the anchoring base 53, at the location of the centering hole.

The advantages provided by the invention are obvious. Owing to the deformable skirt 57 of the anchoring base 53 and to the conical portion 62 of the pin 60, the invention ensures a perfect positioning and centering of the anchoring bases in the bottom wall 51 of the casing. The anchoring base is perfectly secured to the bottom wall owing to its retaining groove 56 into which penetrates the plastics material of the bottom wall during the molding. After unmolding the anchoring bases, the molding is withdrawn and then bored and tapped after becoming stabilized. This ensures a perfect parallelism of the pivots 52 after they are assembled by screwing the studs 54 into the anchoring bases 53. It should also be noted that the imprint left by the pin in the molding allows the necessary boring and tapping for the fixing of the stud in the anchoring base to be performed without the drills or taps coming into contact with the molded material which often has an abrasive structure prejudicial to the service life of the tools. The deformability of the skirt 57 is also advantageous in that the correct mounting of the anchoring base in the bottom wall is also obtained without problems with the anchoring bases whose fit is extremely tight and where a smaller extra-thickness would normally involve the risk of excluding a correct closing of the mold.

Of course, the invention is by no means limited to the form of embodiment described and illustrated which has been given by way of example only. In particular, it comprises all means constituting technical equivalents to the means described as well as their combinations if the latter are carried out according to its gist and used within the scope of protection as claimed.

What is claimed is:

1. An improvement in an electric switching device, of the type comprising essentially at least one leaf spring mounted in curved position between the internal surface of a casing and the opposite surface of a member mounted pivotally about an axis parallel to the axis of the casing, under the action of an actuating member against the action of the said spring, said casing being provided with a stationary electric contact device and the movable member being provided with a contact element forming a movable contact intended to cooperate with one of the said stationary contacts, the said leaf spring being fixed at one end on the internal surface of the casing by the head of a screw with a tightening nut, wherein a stop member is interposed between the said spring end to be fixed and the said internal surface of the casing and provided with a recess of a shape complementary to the shape of the said spring end so as to lock the said spring end in the said recess, and stop means are provided integral with the said casing and comprising a flat stop surface perpendicular to the internal surface of the casing, upon which bears a planar lateral surface of the head.

2. An improvement according to claim 1, wherein are provided intercalated means for spring guiding secured to the internal surface of the said casing and comprising, for each spring, a guiding slot allowing the passage and lateral guiding of the latter.

3. An improvement according to claim 2, wherein the said intercalated guiding means are constituted by separate members in the form of a bar provided with a transverse guiding slot for a leaf spring.

4. An improvement according to claim 3, wherein the said bar is fixed to the casing by means of an anchoring slot of an appropriate shape, preferably tapered, provided in the internal surface of the casing.

5. An improvement according to claim 1, wherein the said stop member is obtained from a plate preferably of electrically conductive material and having a thickness substantially equal to the thickness of the said leaf spring, and an end portion of the said plate is raised to form a flange extending in perpendicular relationship to the plane of the plate whereas the end portion opposite to the said flange is folded in itself so that the said raised edge and the end of the folded portion constitute the lateral surfaces of the said recess.

6. An improvement according to claim 1, wherein the said stop means intergral with the casing are constituted by a rib which may be cast integral with the said casing.

7. An improvement according to claim 1, wherein the said planar lateral surface of the head is constituted by a flat surface or by one of the faces of a square profile of the said head.

8. An improvement according to claim 1, wherein the said stop member bears upon the planar stop surface integral with the casing, by one of its lateral surfaces.

9. An improvement according to claim 1, wherein the said leaf spring is obtained by rolling.

10. An improvement according to claim 1, in a switching device comprising several levers mounted rotatably about a same axis, one above the other, wherein the said stop means integral with the casing are constituted by an axial rib and the intercalated guiding means are constituted by a bar of appropriate length which extends in the axial direction of the casing and comprises several juxtaposed transverse guiding slots, one slot for each spring.

* * * * *